United States Patent Office 3,661,797
Patented May 9, 1972

3,661,797
ANALYTICAL REAGENTS FOR QUANTITATIVE
DETERMINATION OF WATER
Clifton E. Meloan, Manhattan, Kans., and Thomas G. Bunting, Willoughby, Ohio, assignors to Kansas State University Research Foundation, Manhattan, Kans.
No Drawing. Filed June 10, 1970, Ser. No. 45,253
Int. Cl. G01n 33/18
U.S. Cl. 252—408
26 Claims

ABSTRACT OF THE DISCLOSURE

Under anhydrous conditions cobalt, nickel, and iron salts react with aromatic diazole compounds, such as piaselenole and piasthiole, to produce complexes which are capable of decomposing reproducibly in the presence of water, and are therefore useful as analytical reagents for water determinations. The sensitivity of the compounds varies with the element in the heterocyclic ring, namely selenium or sulfur, which complexes with the cobalt, nickel, or iron salt. Sensitivity can be further varied by employing the complex in admixture with a water reactive compound, such as cobaltous chloride or nitrate. Depending on the reagent or reagent mixture selected, water determinations in the range of p.p.b. through p.p.m. to a few percent can be made, using a spectro-photometer. Interferences are limited.

BACKGROUND AND SUMMARY

Since the determination of water must be included in nearly every complete analysis, and a special analysis for water is of frequent interest, methods for quantitative determination of water have been the subject of extensive investigation for many years. Nevertheless, the methods in general use today, all present difficulties and limitations which strongly indicate the need for further improvement.

Current methods are (1) a vacuum drying at the B.P. of $H_2O$ for two hours and weigh the residue, (2) an oven drying at 110° C. to a constant weight, (3) Karl Fischer titrations, (4) a toluene distillation, and (5) evolution of $H_2C_2$ by using $CaC_2$. The first two methods take a long time and frequently do not give the correct answer because anything that is volatile at that temperature will also be measured. Karl Fischer titrations are faster but require an expensive reagent. Moreover, the reagent is not stable and needs to be standardized every day, and it is necessary to use an electrical endpoint detection device for colored solutions which is difficult with very low dielectric solutions.

The last two methods also have serious limitations. While a toluene distillation is very good for large amounts of water, it requires a lot of time and a specially calibrated piece of equipment. The acetylene production is very sensitive but few chemists in the world have the technique to make the accurate gas manipulations necessary.

The Karl Fischer titration method was first described in 1935. It is the only chemical method for water determination which has achieved the status of general use although prior to the development of this method, as well as subsequently, there has been a continuing search for chemical methods which are simple and accurate, applicable over a wide range of water contents, and subject to a minimum of interferences. Even the Karl Fischer reagent (a solution of iodine, sulfur dioxide, and pyridine in methanol) is subject to interferences which must be either eliminated or corrected. Compounds which react with one or more of the components of the Fischer reagent include ascorbic acid, hydrazine salts, mercaptans, alkali carbonates and bicarbonates, alkali sulfites and pyrosulfites, boric acid and oxides, cupric and ferric salts, metal hydroxides and oxides, sodium arsenate and arsenite, sodium tetraborate and thiosulfate, and stannous chloride.

This invention is based in part on the discovery that aromatic diazole compounds, such as piaselenole and piasthiole, will react with cobalt, nickel, or iron salts under anhydrous conditions to produce complexes which decompose quantitatively (or at least reproducibly) in the presence of water, thereby making these complexes useful as analytical reagents for water determinations. Not only has the literature failed to report the preparation of such complexes previously, but the lack of reactivity between compounds such as piaselenole with many metals and metal ions has been recognized. In 1955, Ziegler and Glemser [Z. Anal. Chem., 146, 29 (1955)] reported the reaction of piaselenole with palladous chloride. The resulting compound was reported to be difficult soluble in water and pound was reported to be difficultly soluble in water and observed. The authors further reported that no reaction occurred between piaselenole and cobalt, nickel, iron, and other metals.

Piaselenole (2,1,3-benzoselenodiazole) and piasthiole (2,1,3-benzothiodiazole) were first prepared by Hinsberg in 1889 [Chemische Berichte, 22, 2895 (1889)]. Hinsberg's work showed that at least piaselenole can be satisfactorily prepared by reaction of selenous acid or sulfurous acid, respectively, with o-phenylenediamine. More recently, piasthiole has been prepared and tested as a carcinogenic agent. Hoste in 1959 reported the use of 3,3'-diaminobenzidine as a reagent for the quantitative determination of trace amounts of selenium [Anal. Chim. Acta, 2, 402 (1948)]. As can be seen, relevant prior art references are meager. It is believed that there are no direct antecedents to the present invention: there being no prior disclosure or suggestions in the literature that benzodiazole compounds can be modified to produce analytical reagents for quantitative water determinations.

The compounds or "complexes" of cobalt salts with benzodiazole compounds vary in sensitivity depending on the element selected from Period VI-A of the Periodic Table which is substituted in the heterocyclic ring, such as:

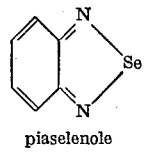 

piaselenole          piasthiole

For example, the selenium atom in piaselenole provides the cobalt complex thereof with a water sensitivity in the parts per billion (p.p.b.) region. In piasthiole, the sulfur atom makes the cobalt complex less sensitive, and the complex is therefore usable for water determinations at a lower sensitivity. The Se atom makes the complex about 25% more sensitive than the S atom.

In water determinations, piaselenole and piasthiole therefore complement each other extremely well together covering the range from determinations in parts per billion through parts per million. Where still further reduced sensitivity is required, as where the test material may contain as much as 1–2% water, it has been discovered that the complexes can be mixed with water-reactive compounds, which react with most of the water, thereby expanding the range of usefulness of the complexes. Specific compounds which have been found to be well adapted for this purpose are cobaltous chloride and cobaltous nitrate.

DETAILED DESCRIPTION

The preferred starting materials for practicing the present invention are piaselenole (2,1,3-benzoselenodiazole) and piasthiole (2,1,3-benzothiodiazole). Piaselenole can be prepared by reacting o-phenylenediamine with selenous acid. There are characterizing studies of the molecular structure of these compounds. See, for example, P. V. Luzzoti, ACTA Cryst. 4, 193 (1951).

The following structural formula is now generally accepted as representative of the compounds, where A, respectively, is selenium or sulfur:

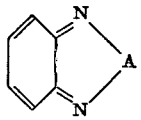

One method for preparing such compounds is described in Chemische Berichte, 22, 2895 (1889). Analogous methods of preparation can also be used. Thionyl chloride or selenous acid can be reacted with a wide variety of aromatic diamine compounds to form a so-called "ligand." For example the diamine can be o-phenylene diamine, 3,4 - diaminotoluene, 4,5-dimethyl-o-phenyldiamine, 4-methoxy-o-phenyldiamine, and 4-chloro-o-phenylene diamine. In practicing the present invention, the ligand, such as piaselenole or piasthiole, is reacted with a cobalt, nickel, or iron salt under anhydrous conditions to produce the novel analytical reagents of this invention. Preferably, the cobalt and nickel and in their divalent forms, providing cobaltous or nickelous salts. The iron is preferably in its trivalent or ferric form. Advantageously, the complexing reaction of the metal salt with the ligand is carried out under substantially anhydrous conditions, since the presence of moisture in excessive amounts can prevent formation of the desired compounds. The ligands can be complexed anhydrously with the metal salts by a "dry melt "technique. Once the compounds have been prepared, they should be maintained under anhydrous conditions until used if they are to be stable and decomposition avoided.

While the complexes can be made and used in a variety of salt forms, it has been found advantageous in water determinations to use the complexes as halide salts, viz of the chloride iodide or bromide salts of cobalt, nickel, or iron, especially the cobaltous, nickelous, and ferric salts of these monovalent anions. The so-called "psuedohalide" salts (viz isocyanate or selenocyanate) would be regarded as equivalent. For other purposes, metal salt can include salts of other organic or inorganic acids, including, for example, acetate, chlorate, perchlorate, sulfate, etc., as is well known in the chemical arts. Virtually any anion which forms an anhydrous salt, and where the resulting salt is stable as a dry solid can be used to form the complexes.

In general, the complexes can be represented by the general formula

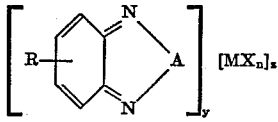

wherein A is selected from selenium or sulfur, R is none, one or two groups substituted in the benzoid ring selected from methyl, methoxy, or halo, M is selected from cobalt, nickel, or iron, X is an anion forming a salt with said M, and $n$, $y$ and $z$ are integers selected as required to form neutral complexes.

The benzene ring can be substituted at one or both of the 4 or 5 carbon positions with a variety of substituent groups, and the resulting complexes will still have the same essential properties as those formed from piaselenole or piasthiole. For example, possible substituent groups include chlorine, bromine, iodine (halo), and alkyl or alkoxy, such as methyl, ethyl, methoxy, ethoxy, etc. Equivalent complexes can also be prepared by substituting other ring structures for the benzene ring, especially other aromatic rings.

When employed for quantative water determination, as will be subsequently described in detail the cobalt or nickel piaselenole compounds provide sensitivity in the p.p.b. region. The corresponding piasthiole compounds can also be used as analytical reagents for quantitative water determinations and are somewhat less sensitive. Consequently, these groups of reagents tend to complement each other, providing a method for determining trace amounts of water over an extended range. For determination of still higher water contents, the complexes can be modified by admixture with water-reactive compounds. For example, water-reactive Cobalt compounds, such as cobaltous chloride or cobaltous nitrate can be used to expand the range of usefulness of the cobalt complexes. By admixing small percentages of the complexes with such water-reactive compounds, determinations can be made up to 1 or 2% water. It will be understood that the relative proportions of the water-reactive fillers and the complexes can be varied as required to provide the desired sensitivity. In general, however, a minor proportion by weight of the complexes will be employed in combination with a major proportion by weight of the water-reactive fillers. For example, from .5 to 10 parts by weight of the complex can be mixed with each 100 parts by weight of the water-reactive filler to provide a composition of greatly reduced water sensitivity.

This invention is further illustrated by the following specific examples, which are intended to be illustrative and not limiting.

EXAMPLE I

Piaselenole.—An aqueous solution of o-phenylenediamine dihydrochloride was added to a slight excess of an aqueous solution of selenous acid. The resulting precipitate was digested for two hours at 60° C. The solution was filtered and the white needles thus obtained were recrystallized from ethanol by the addition of water. The resulting material had a melting point of 76.0° C.

Piasthiole.—An aqueous solution of o-phenylenediamine dihydrochloride with a slight excess of sodium sulfite was refluxed at the boiling point for six hours. On cooling the solution, the piasthiole product separated as white needles. After recrystallization from a water-ethanol mixture, the melting point was 43.5° C. The yield of piasthiole can be improved by using thionyl chloride instead of sodium sulfite.

Cobalt complexes.—Cobaltous chloride, anhydrous, was prepared by heating cobaltous chloride hexahydrate at 170° C. for 24 hours. After cooling over anhydrone, the cobaltous chloride thus prepared shows no infrared adsorption due to water. The anhydrous cobaltous chloride was reacted with piaselenole or piasthiole. Three procedures were employed to prepare the cobalt compounds. In the first method, a mixture of cobaltous chloride and piaselenole was heated at 50 to 80° C. in a closed vessel for 1 hour. After cooling, the mixture was washed repeatedly with absolute ethanol to remove the unreacted cobaltous chloride and/or piaselenole or piasthiole. In the second procedure, finely powdered cobaltous chloride was shaken for several minutes with an anhydrous solution of piaselenole or piasthiole in any organic solvent which did not dissolve cobaltous chloride, e.g., benzene, carbon tetrachloride, cyclohexane. The resulting solid was washed repeatedly with absolute ethanol to remove excess reactants. The third method of preparation involved formation of the complex in solution. Both the cobaltous chloride and the piaselenole or piasthiole were dissolved in organic solvents, e.g., acetone, ethanol and the piaselenole or piasthiole solution was added to a slight excess of the cobaltous chloride solution. The resulting precipitate was washed with absolute ethanol to remove impurities. All three procedures gave olive colored plates, which could be decomposed on prolonged heating at elevated temperatures. Anhydrous cobaltous chloride is a product of the thermal decomposition of the piaselenole and the piasthiole complexes.

Composition and Structure.—Elemental analysis of piaselenole was in accord with the results reported by Hinsberg, Chemische Berichte, 22, 2895 (1889). An elemental analysis of piasthiole has been reported, Zhurnal Obschehei Khimii, 25, 199, (1955), and the results were strictly analogous to the piaselenole system. Composition data are presented in Table I. The data in Table I indicate that the ratio of cobalt to piaselenole is 1:1.

TABLE I.—ELEMENTAL ANALYSES

| Empirical formula | Experimental (percent) | | | Theoretical (percent) | | |
|---|---|---|---|---|---|---|
| | C | H | N | C | H | N |
| $C_6H_4N_2Se$ | 39.49 | 2.31 | 15.38 | 39.34 | 2.19 | 15.30 |
| $C_6H_6N_2Se$ | | | | 38.92 | 3.24 | 15.14 |
| $C_6H_4N_2S$ | | | | 52.95 | 2.94 | 20.59 |
| $C_6H_6N_2S$ | | | | 52.17 | 4.35 | 20.29 |
| $(C_6H_4N_2Se)CoCl_2$ | 23.28 | 1.60 | | 23.00 | 1.28 | 8.94 |
| $(C_6H_4N_2Se)_2CoCl_2$ | | | | 29.03 | 1.61 | 11.29 |
| $(C_6H_4N_2Se)_3CoCl_2$ | | | | 31.81 | 1.77 | 12.37 |
| $(C_6H_6N_2Se)_4CoCl_2$ | | | | 33.41 | 1.86 | 12.99 |
| $(C_6H_4N_2S)CoCl_2$ | | | | 27.05 | 1.50 | 10.53 |

Vapor pressure osmometer measurements of the molecular weight of piaselenole gave a value of 191 grams/mole. The error involved, +4.4% relative, is of the same direction and magnitude as that for the standard, benzil, +4.3% relative. Because of the extremely low solubility of the cobalt compound in all common solvents, the molecular weight of this compound could not be determined by cryoscopic or ebullioscopic methods.

The infrared spectrum of the cobalt compounds of piaselenole and piasthiole were obtained. The data was not conclusive on the exact bonding of the cobalt to the ligand. However, since the N—Se bonds experience large shifts relative to the C—C and C—H bonds, bonding is probably to the heterocyclic rather than to the aromatic carbon portion of the molecule. In thiocyanate complexes. cobalt is bound to nitrogen [see Inorg. Chem. 4, 715 (1965),] and in selenecyanate complexes cobalt is bound to nitrogen. On this basis, one would expect cobalt to be coordinated to nitrogen. And since the elemental analysis, discussed previously, and the absorbance data below, indicate a cobalt to piaselenole ratio of 1:1, the cobalt complexes may exist as polymers, with cobalt as a bridge between two nitrogen atoms, one in each of two piaselenole molecules.

EXAMPLE II

The reaction of water with the piaselenole cobalt complex prepared as described in Example I was used as the basis for the determination of trace amounts of water. The liberated piaselenole is measured, the excess reagent settling to the bottom of the cell. The piasthiole cobalt complex (prepared as described in Example I) can also be used employing the same method described for piaselenole. However, the piasthiole is less sensitive. The absorptivity difference is about 4000 (17,000 for Se vs. 14,000 for S).

A study of the UV and visible absorption spectra of piaselenole and piasthiole shows that the two maxima for piaselenole, 232 and 330 nm., and those for piasthiole, 219 and 310 nm., are very insensitive to solvent changes. It should be noted that the relative intensities of the two peaks are reversed for the two compounds.

The cobalt complexes of both piaselenole and piasthiole are exceptionally insoluble in all common solvents with the exception of water and organic compounds containing nitrogen in the molecule (amines, amides, pyridines, etc.) which destroy the cobalt compound by forming complexes with the cobalt. That this "solution" of the cobalt compounds was actually destruction by complexation of cobalt with the solvent molecules and not a true solution of the cobalt piaselenole or cobalt piasthiole compounds was demonstrated by obtaining UV and visible spectra of the resulting solutions. In all cases, water and numerous nitrogen-containing solvents, the spectra obtained were sums of the spectrum of piaselenole or piasthiole in that particular solvent plus the spectrum of cobaltous chloride in that solvent. In no case was evidence found to indicate any interaction of cobalt with piaselenole or piasthiole in these solvents.

The reaction of cobaltous piaselenole with water $$(C_6H_4N_2Se)CoCl_2 + XH_2O \rightarrow C_6H_4N_2Se + CoCl_2 \cdot XH_2O$$

was therefore used as a means of determining trace amounts of water in organic solvents. Formation of piaselenole and cobaltous chloride hydrate by the reaction of water with cobalt piaselenole was demonstrated by UV and visible spectra as discussed above. The cobalt compound of piasthiole reacts with water in the same manner as the piaselenole compound.

Because of the difficulty of obtaining a water-free solvent which would dissolve both piaselenole and cobaltous chloride without preventing their reaction, mole ratio studies were not performed on the cobalt piaselenole system. Various weighed amounts of piaselenole were dissolved in 50–50 (volume) mixtures of water and absolute ethanol. From absorbance measurements on these solutions, the molar absorptivity of piaselenole was determined for these to be $1.91 \times 10^4$ liters/mole-cm. (Later determinations have shown a corrected value of $1.74 \times 10^4$ liters/mole-cm.) Weighted amounts of the cobalt piaselenole and cobaltous chloride hydrate. From absorbance-measurements on the solutions, the ratio of cobalt to piaselenole was determined to be 1:1, which is in agreement with the elemental analysis presented previously. Data are presented in Table II.

TABLE II.—RATIO OF COBALT TO PIASELENOLE

| | | Piaselenole (moles×10⁴) | | | |
|---|---|---|---|---|---|
| | | | Theoretical | | |
| Cobalt P piaselenole (g./l.) | Absorbance [a] | Observed | 1:1 | 2:1 | 3:1 [b] |
| 0.0310 | 0.193 | 1.01 | 0.99 | 1.25 | 1.37 |
| 0.0408 | 0.243 | 1.27 | 1.30 | 1.65 | 1.80 |
| 0.0527 | 0.312 | 1.64 | 1.69 | 2.13 | 2.33 |
| 0.0613 | 0.364 | 1.91 | 1.95 | 2.47 | 2.71 |
| 0.0745 | 0.460 | 2.41 | 2.33 | 3.00 | 3.29 |
| 0.0822 | 0.516 | 2.70 | 2.63 | 3.32 | 3.63 |
| 0.0896 | 0.535 | 2.80 | 2.86 | 3.61 | 3.96 |
| 0.0911 | 0.547 | 2.86 | 2.91 | 3.67 | 4.03 |
| 0.1007 | 0.619 | 3.24 | 3.22 | 4.06 | 4.45 |
| 0.1121 | 0.699 | 3.66 | 3.58 | 4.52 | 4.95 |
| 0.1209 | 0.734 | 3.84 | 3.86 | 4.88 | 5.34 |
| 0.1360 | 0.821 | 4.30 | 4.35 | 5.49 | 6.01 |

[a] After 1:10 dilution.
[b] Piaselenole:cobalt.

The effect of the use of varying amounts of cobalt piaselenole on the determination of water was investigated. Table III presents data for the absorbance of a solution of 5.0 mg. of water/liter of benzene. The data failed to indicate any significant variation in the absorbance, thereby demonstrating that the determination of water is independent of the amount of cobalt piaselenole added.

TABLE III

Effect of cobalt piaselenole variation

| Cobalt piaselenole (g.): | Absorbance |
|---|---|
| 0.001 | 0.481 |
| 0.005 | 0.456 |
| 0.010 | 0.470 |
| 0.020 | 0.463 |
| 0.040 | 0.494 |
| 0.060 | 0.456 |
| 0.080 | 0.474 |
| 0.100 | 0.466 |
| 0.200 | 0.488 |
| 0.400 | 0.493 |
| 0.600 | 0.477 |
| 0.800 | 0.482 |
| 1.00 | 0.462 |
| | 0.474 |

Calibration curves for water in benzene and for water in carbon tetrachloride were prepared. Beer's Law is obeyed from 0.25 to at least 8 mg. of water/liter of benzene (or carbon tetrachloride). Higher concentrations of water can be analyzed by suitable dilution of the sample after reaction and separation of the reagent. The method is sensitive to 7 p.p.b. of water in benzene and to 13 p.p.b. of water in carbon tetrachloride, and amino acid do not interfere.

EXAMPLE III

Samples of benzene and carbon tetrachloride were both analyzed for water content by a standard Karl Fischer titration and by reaction with cobalt piaselenole. For benzene the cobalt piaselenole method gave 0.789±0.013 mg. of water/100 ml. of benzene, while Karl Fischer titration gave 0.791±0.010 mg. of water/100 ml. of benzene. Water in carbon tetrachloride was 4.57±0.08 mg./100 ml. of carbon tetrachloride by reaction with cobalt piaselenole, and 4.57±0.08 mg./100 ml. of carbon tetrachloride by Karl Fischer titration. The two methods were in extremely good agreement. Data are presented in Table IV for water in benzene and in Table V for water in carbon tetrachloride.

TABLE IV.—WATER IN BENZENE

| | Cobalt piaselenole | | Karl Fisher | |
|---|---|---|---|---|
| Absorbance | | Water (mg./100 ml.) | Reagent (ml.) | Water (mg./100 ml.) |
| 0.746 | | 0.771 | 3.96 | 0.787 |
| 0.751 | | 0.776 | 3.80 | 0.811 |
| 0.771 | | 0.796 | 3.78 | 0.791 |
| 0.780 | | 0.805 | 4.10 | 0.782 |
| 0.756 | | 0.780 | 3.80 | 0.790 |
| 0.772 | | 0.797 | 3.92 | 0.778 |
| 0.746 | | 0.771 | 3.74 | 0.789 |
| 0.764 | | 0.789 | 3.94 | 0.795 |
| 0.778 | | 0.804 | 4.02 | 0.803 |
| 0.775 | | 0.800 | 3.66 | 0.781 |
| 0.773 | | 0.797 | 3.81 | 0.779 |
| 0.758 | | 0.782 | 3.92 | 0.800 |
| Average | | 0.789 | | 0.791 |

TABLE V.—WATER IN CARBON TETRACHLORIDE

| | Cobalt piaselenole | | Karl Fisher | |
|---|---|---|---|---|
| Absorbance * | | Water (mg./100 ml.) | Reagent (ml.) | Water (mg./100 ml.) |
| 0.390 | | 4.50 | 22.17 | 4.59 |
| 0.406 | | 4.69 | 22.22 | 4.60 |
| 0.391 | | 4.52 | 21.64 | 4.48 |
| 0.386 | | 4.46 | 21.84 | 4.52 |
| 0.397 | | 4.59 | 22.03 | 4.56 |
| 0.400 | | 4.62 | 22.80 | 4.72 |
| 0.398 | | 4.60 | 22.17 | 4.59 |
| 0.390 | | 4.50 | 21.50 | 4.45 |
| 0.407 | | 4.70 | 21.74 | 4.50 |
| 0.390 | | 4.50 | 22.51 | 4.66 |
| 0.399 | | 4.61 | 22.42 | 4.64 |
| 0.393 | | 4.54 | 21.69 | 4.49 |
| Average | | 4.57 | | 4.57 |

* Diluted 1:10.

In general, interferences are limited to materials which have a greater affinity for water than the cobaltous ion, and to materials which complex cobalt more strongly than does piaselenole. Among the latter are most organic compounds with trivalent nitrogen, including amines, amides, nitriles and various heterocycles.

EXAMPLE IV (A) Preparation of a calibration curve with cobalt-piaselenole

Chemicals:
(1) "Dry" Methanol first, fractionally distill reagent grade MeOH, and then proceed according to Vogel, Practical Organic Chemistry, pp. 169–170 (1956).
(2) Cobalt-piaselenole: Piaselenole and its cobalt complex is prepared as described in Example I.
(3) $CoCl_2$ is heated for 24 hours and ground into a fine powder.
(4) $K_2C_2O_4 \cdot H_2O$ Apparatus:
Beckman DB spectrophotometer, w./1 cm. quartz cells, centrifuge, dry box, test tube shaker.

Procedure:
Approximately 0.01 g. of the cobalt-piaselenole complex was mixed, in a dry box, with an amount of $CoCl_2$ equal to 50 times the weight of the cobalt-piaselenole complex. This mixture was then combined with amounts of the $K_2C_2O_4 \cdot H_2O$ that corresponded to 1 mole of water. This was repeated for values of 2 moles and 4 moles of water on the $K_2C_2O_4 \cdot H_2O$.
About 5 ml. of the dry methanol was added to each of three different mixtures and shaken on a test tube shaker for 10 minutes.
For each solution, a 0.2 ml. aliquot was diluted with 25 ml. of the dry MeOH. A 0.2 ml. aliquot of this solution was diluted with 25 ml. of the dry MeOH. Each solution was measured with a Beckman DB from 380 nm. to 280 nm. The absorbance at 330 nm. was noted.
Each value was plotted on a graph of absorbance (A) vs. conc. This was extrapolated to find the amount of water in the MeOH.
This curve is the standard curve.

(B) Procedure for determination of water in foods using cobalt-piaselenole

Chemicals:
(1) "Dry" Methanol
(2) Cobalt-piaselenole
(3) $CoCl_2$
(4) Food sample Apparatus:
(1) Beckman DB Spectrophotometer, with 1 cm. quartz cells
(2) Centrifuge
(3) Dry Box
(4) Test tube shaker Procedure:
Mix about 0.01 gram (in a dry box) of the cobalt-piaselenole with an amount of $CoCl_2$ that equals 50 times the weight of the cobalt-piaselenole. Care should be taken to avoid any caking of the mixture. Place this mixture in a 20 cm. test tube.
Combine this mixture with a 0.1 gram sample of the food.
Add 5 ml. of the dry methanol, place in test tube shaker, and mix for 10 minutes.
Take a 0.2 ml. aliquot and dilute to 25 ml. Then take a 0.2 ml. aliquot of this and dilute to 25 ml.
Place this solution in the quartz cell and measure the absorbance at 330 nm. The 100% was set using the "dry" methanol. The solutions are time stable, but they shouldn't be allowed to pick-up any water from the air.
The values of the absorbance are then plotted on the graph containing the standardization curve for the cobalt-piaselenole and the amount of water in the sample is read directly minus the amount of water in the "dry" methanol.

EXAMPLE V

Ligands are prepared as described previously, by reacting ring substituted piaselenole or piasthiole compounds with selenous acid or thionyl chloride (see Example I). Specific examples of such diamines are 3,4-diaminotoluene, 4,5-dimethyl-o-phenylenediamine, 4 - methoxy-o-phenyl-enediamine, 4 - chloro - o - phenylene-diamine, and corresponding bromo or iodo phenylene-diamines. The ligands thus prepared are then complexed with the metal salts.

For example, a 1:1 water unstable cobalt complex with any of these above-mentioned ligands can be prepared by dissolving $CoCl_2$ in acetone, and adding enough of an acetone solution of the ligand until a stoichiometric amount has been added. The resulting complexes can be washed with acetone and dried under a vacuum at 70° C. A complex containing a higher proportion of ligand to cation can be formed by using an excess of the ligand, such as a molar ratio of 7:1 of the ligand to the cation. Experimental evidence indicates that the resulting complex contains 1.5:1 ligand to cation.

The above-mentioned ligands can also be complexed to form water unstable products with nickelous chloride. The $NiCl_2$ is dissolved in alcohol, and enough of the alcohol solution of the ligand is added until a stoichiometric amount has been added. The resulting complexes are washed several times in alcohol and dried in a vacuum at 70° C.

EXAMPLE VI

Water unstable complexes of piaselenole and piasthiole are prepared from ferric chloride. The $FeCl_3$ is dissolved in ethyl ether, and to this is added an ether solution of the ligand. A 7:1 excess of the ligand to the cation has been found desirable in forming the complexes. Preferably, the total volume is kept to a minimum so that the complex will form rapidly. The resulting complexes are washed several times in ether and dried in a vacuum at 70° C.

EXAMPLE VII

Complexes corresponding to the foregoing can be formed by using the cobalt, nickel, or iron cation, in the form of their halide or pseudo-halide salts. For example, piaselenole can become complexed with cobaltous bromide, and the resulting $CoBr_2$— piaselenole complex is similar in both appearance and reactivity (water sensitivity) to the corresponding complex formed with cobaltous chloride.

In preparing such complexes, a typical procedure is to dissolve approximately 1 gram of the ligand in 50 ml. of an anhydrous solvent, mix it with 50 ml. of the solution with about .5 grams of the metal salt dissolved in the same anhydrous solvent. The mixture can be digested for about 1 hour at 60° C., cooled, and filtered. The precipitate is then washed several times with the anhydrous solvent, and dried at 60° C. in a vacuum oven.

What is claimed is:

1. A chemical complex capable of decomposing reproducibly in the presence of water, said complex being in a stable anhydrous form and being represented by the general formula

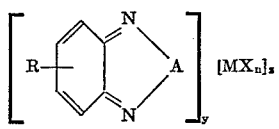

wherein A is selected from selenium or sulfur, R is none, one, or two groups substituted in the benzoid ring selected from methyl, methoxy, or halo, M is selected from cobalt, nickel, or iron, X is an anion forming a salt with said M, and $n$, $y$, and $z$ are integers selected as required to form a neutral complex.

2. The complex of claim 1 in which A is selenium.
3. The complex of claim 1 in which A is sulfur.
4. The complex of claim 1 in which M is cobalt.
5. The complex of claim 1 in which M is nickel.
6. The complex of claim 1 in which M is iron.
7. An analytical reagent mixture for quantitative determination of water, said reagent mixture being in a stable anhydrous form and consisting essentially of the complex of claim 1 in admixture with a water reactive compound selected from cobaltous chloride or cobaltous nitrate.

8. A chemical complex capable of decomposing reproducibly in the presence of water, said complex being in a stable anhydrous form and being represented by the general formula

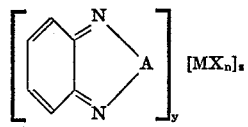

wherein A is selected from selenium or sulfur, M is selected from nickelous, cobaltous, and ferric, X is an anion selected from chloride, bromide, and iodide and $n$, $y$, and $z$ are integers selected as required to form a neutral complex.

9. The complex of claim 8 in which A is selenium.
10. The complex of claim 8 in which A is sulfur.
11. The complex of claim 8 in which M is cobaltous.
12. The complex of claim 8 in which M is nickelous.
13. An analytical reagent mixture for quantitative determination of water, said reagent mixture being in a stable anhydrous form and consisting essentially of the complex of claim 8 in admixture with a water reactive compound selected from cobaltous chloride or cobaltous nitrate.
14. A chemical complex capable of decomposing reproducibly in the presence of water, said complex being in a stable anhydrous form and being represented by the formula

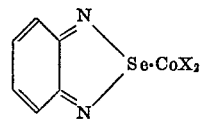

wherein X is a monovalent anion selected from chloride, bromide, or iodide.

15. The complex of claim 14 in which said anion is chloride.
16. A chemical complex capable of decomposing quantitatively in the presence of water, said complex being in a stable anhydrous form and being represented by the formula

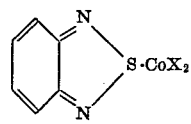

wherein X is a monovalent anion selected from chloride, bromide, iodide, isocyanate, or selenocyanate.

17. The complex of claim 16 in which said anion is chloride.
18. The anhydrous complex of piaselenole and a cobalt salt selected from the group consisting of cobaltous chloride, bromide or iodide.
19. The anhydrous complex of piasthiole and a cobalt salt selected from the group consisting of cobaltous chloride, bromide or iodide.
20. A chemical complex capable of decomposing reproducibly in the presence of water, said complex being in a stable anhydrous form and being represented by the formula

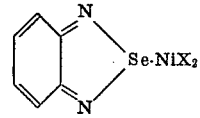

wherein X is a monovalent anion selected from chloride, bromide iodide, isocyanate, or selenocyanate.

21. The complex of claim 20 in which said anion is chloride.
22. A chemical complex capable of decomposing reproducibly in the presence of water, said complex being in a stable anhydrous form and being represented by the formula

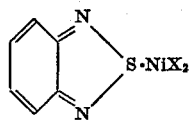

wherein X is a monovalent anion selected from chloride, bromide, or iodide.

23. The complex of claim 22 in which said anion is chloride.

24. The anhydrous complex of piaselenole and a nickel salt selected from the group consisting of nickelous chloride, bromide or iodide.

25. The anhydrous complex of piasthiole and a nickel salt selected from the group consisting of nickelous chloride, bromide or iodide.

26. An analytical reagent mixture for quantitative determination of water, said reagent mixture being in a stable anhydrous form and consisting essentially of (a) a complex selected from the group consisting of piaselenole cobaltous chloride, bromide or iodide, piasthiole cobaltous chloride, bromide or iodide, piaselenole nickelous chloride, bromide, or iodide and piasthiole nickelous chloride, bromide or iodide, and (b) a water reactive compound selected from the group consisting of cobaltous chloride and cobaltous nitrate.

References Cited
UNITED STATES PATENTS 2,761,312  9/1956  Line _____ 73—53

JOHN T. GOOLKASIAN, Primary Examiner

M. E. McCAMISH, Assistant Examiner

U.S. Cl. X.R.

23—230 R; 73—73; 116—114 R; 260—239.9, 239.95, 302, 309